United States Patent [19]
Barbee et al.

[11] Patent Number: 5,405,920
[45] Date of Patent: Apr. 11, 1995

[54] POLYURETHANE POWDER COATINGS

[75] Inventors: Robert B. Barbee; Brian S. Phillips, both of Kingsport, Tenn.

[73] Assignee: Eastman Chemical Company, Kingsport, Tenn.

[21] Appl. No.: 291,077

[22] Filed: Aug. 8, 1994

[51] Int. Cl.$^6$ ............... C08L 75/06; C08L 75/12; C08L 67/02

[52] U.S. Cl. .................. 525/440; 525/444; 525/934; 428/423.1; 428/425.8

[58] Field of Search ............... 525/440, 934

[56] References Cited

U.S. PATENT DOCUMENTS

| | | | |
|---|---|---|---|
| 3,211,585 | 10/1965 | Meyer et al. | 117/232 |
| 3,249,578 | 5/1966 | Meyer et al. | 260/33.4 |
| 3,646,374 | 2/1972 | Jordan et al. | 310/45 |
| 4,476,279 | 10/1984 | McGregor et al. | 524/602 |
| 5,229,470 | 7/1993 | Nozakl et al. | 525/440 |

OTHER PUBLICATIONS

Rucote 103 Technical Bulletin, Ruco Polymer Corporation.

*Primary Examiner*—Patricia A. Short
*Attorney, Agent, or Firm*—Bernard J. Graves, Jr.; Harry J. Gwinnell

[57] ABSTRACT

This invention relates to thermosetting powder coatings formulated with a polyisocyanate and a blend of a hydroxylated polyester resin having a low hydroxyl number and a hydroxylated resin based on tris(hydroxyethyl)isocyanurate having a high hydroxyl number. Powder coatings from this blend exhibit high hardness and good caking stability.

15 Claims, No Drawings

POLYURETHANE POWDER COATINGS

FIELD OF THE INVENTION

This invention belongs to the field of thermosetting powder coatings. More particularly, this invention relates to a blend of a certain polyester having a high hydroxyl number and Tg with a polyester having a low hydroxyl number. Such compositions possess good caking stability and polyurethane coatings formed therefrom provide have increased hardness while at the same time maintaining good storage, i.e., caking stability.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. The "orange peel" surface problem has caused thermosetting coatings to be applied from organic solvent systems which are inherently undesirable because of the environmental and safety problems that may be occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

RUCOTE 103 polymer (Ruco) technical bulletins describe increasing hardness by blending RUCOTE 107 with a high hydroxyl number resin RUCOTE 103 to provide coatings having improved hardness.

U.S. Pat. No. 5,229,470 describes low gloss polyurethane powder coatings prepared by blending hydroxyl polyesters having a difference in gel time of at least three minutes.

U.S. Pat. No. 3,211,585 describes polyesters comprising the reaction product of a polymeric ester of a polycarboxylic acid of the group consisting of terephthalic acid, isophthalic acid and tris(hydroxyethyl)isocyanurate, with 10–40 % of an organic polyisocyanate which is useful for coating electrical conductors.

U.S. Pat. No. 3,249,578 describes polyesters prepared from tris(hydroxyethyl)isocyanurate used to coat electrical conductors.

U.S. Pat. No. 3,646,374 describes polyester-imide resins comprised of tris(hydroxyethyl)isocyanurate used for coating and electrically insulating core members of dynamoelectric machines.

U.S. Pat. No. 4,476,279 discloses a magnet wire enamel comprising a high solids low viscosity organic solvent solution of a tris(hydroxyethylisocyanurate)-polyester having a hydroxyl number of 216 to 316, and a ratio of hydroxyl to carboxyl groups of 1.65 to 2.0:1.

The present invention, as described below, relates to novel polyurethane powder coatings exhibiting high hardness upon cure and good caking stability during storage. Prior to the present invention, polyurethane coatings having high hardness were prepared by mixing two types of polyester resins having low and high hydroxyl numbers. This is generally accomplished by preparing resins having high hydroxyl numbers due to increased use of a polyol such as trimethylolpropane; however, this approach lowers the Tg of the composition and hence detracts from the caking stability.

It has now been found that a polyester resin with a high hydroxyl number and high Tg can be made based on isophthalic acid and tris(hydroxyethyl)isocyanurate. This resin can be blended with polyester resins having low hydroxyl numbers to produce powder coating compositions having good caking stability and coatings having high hardness after application by electrostatic spraying and curing.

SUMMARY OF THE INVENTION

This invention relates to powder coatings that exhibit both high hardness and good caking stability. The powder coating compositions are based on a blend of a polyester resin having a low hydroxyl number with a polyester having a high hydroxyl number comprising tris(hydroxyethyl)isocyanurate as a polyol residue.

DETAILED DESCRIPTION OF THE INVENTION

The present invention provides a powder coating composition in the form of an intimate blend, in a finely divided form, comprising A. a blend of resins comprising
  1. about 10 to 40 percent by weight of a polyester resin having a glass temperature of at least 55° C., a hydroxyl number of about 190 to 320, and an inherent viscosity of about 0.1 to 0.5 dL/g determined at 25° C. in a (60/40 by weight) mixture of phenol/tetrachloroethane at a concentration of 0.5 g/100 ml; said polyester comprised of
     a. diacid residues comprised of at least 50 mole percent of isophthalic acid residues; and
     b. diol residues comprised of from about 50 to 100 mole percent of residues of tris(hydroxyethyl)isocyanurate; and
  2. about 60 to 90 percent by weight of a polyester resin comprised of at least 70 mole percent of residues of terephthalic acid and 2,2-dimethyl-1,3-propanediol and having a Tg of 55° to 85° C., a hydroxyl number of 30 to 80, and an inherent viscosity of about 0.1 to 0.3 dL/g; and
B. a cross-linking effective amount of a blocked polyisocyanate.

In the above composition, it is preferred that the component A(1) resin be comprised of at least 75 mole percent of isophthalic acid residues and from about 75 to about 100 mole percent of tris(hydroxyethyl)isocyanurate residues. It is further preferred that the component A(1) resin be comprised of at least 90 mole percent of isophthalic acid residues and from about 80 to about 100 mole percent of tris(hydroxyethyl)isocyanurate residues and that component A be present in a range of about 15 to 25 weight percent and component B be present in a range of about 75 to 85 weight percent.

These novel powder coating compositions exhibit markedly better caking stability than other known polyurethane powder coating compositions having high hardness. The effectiveness of this powder becomes apparent in the comparison of powder coatings based on blends of low hydroxyl resin with (1) typical high hydroxyl resins and (2) the high hydroxyl resins containing tris(hydroxyethyl)isocyanurate as described herein. After three days at 40° C., powder coatings formulated with (1) had poor caking stability while coatings formulated with (2) demonstrated good caking stability.

The high hydroxyl resins of this invention (component A(1)) may be produced using well-known polycondensation procedures. The component A(1) resin preferably has a hydroxyl number from about 190 to 320, most preferably from 200 to 300, and is comprised of repeating, alternating residues of dicarboxylic acids and diols wherein the diacid residues are comprised of at least 50 mole percent of isophthalic acid. Up to 50 mole percent of the diacid residues may be residues of various aliphatic, alicyclic and aromatic diacids, preferably terephthalic acid. Most preferably, the Tg is from about 70° to about 90° C.

The polyol residues of the component A(1) resin are derived from tris(hydroxyethyl)isocyanurate or a mixture of tris(hydroxyethyl)isocyanurate, trimethylolpropane, and 2,2-dimethyl-1,3-propanediol. Such polyol residues also may include up to 10 mole percent of other diols.

The low hydroxyl resins (component A(2)) are typical polyester resins for powder coatings comprised of mainly terephthalic acid as diacid residue and 2,2-dimethyl-1,3-propanediol as diol residue. The polyester has a hydroxyl number in the range of 30 to 80, an acid number of less than 15, and a Tg greater than 55° C. These resins are commercially available, for example as RUCOTE 107 polyester.

The blocked polyisocyanate compounds of the compositions of this invention are known compounds and can be obtained from commercial sources or may be prepared according to published procedures. Upon being heated to cure coatings of the compositions, the compounds become unblocked and the isocyanate groups react with hydroxy groups present on the amorphous polyester to cross-link the polymer chains and thus cure the compositions to form tough coatings. Examples of the blocked polyisocyanate cross-linking component include those which are based on isophorone diisocyanate blocked with ε-caprolactam, commercially available as Hüls 1530 and CARGILL 2400, or toluene 2,4-diisocyanate blocked with ε-caprolactam, commercially available as CARGILL 2450, and phenol-blocked hexamethylene diisocyanate.

The most readily-available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962, incorporated herein by reference. However, the products marketed as ε-caprolactam-blocked isophorone diisocyanate may consist primarily of the blocked, difunctional, monomeric isophorone diisocyanate, i.e., a mixture of the cis and trans isomers of 3-isocyanato-methyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam-blocked, trifunctional trimer of isophorone diisocyanate. The description herein of the cross-linking agents as "polyisocyanates" refers to compounds which contain at least two isocyanato groups which are blocked with, i.e., reacted with, another compound, e.g., ε-caprolactam. The reaction of the isocyanato groups with the blocking compound is reversible at elevated temperatures, e.g., normally about 150° C., and above, at which temperature the isocyanato groups are available to react with the hydroxyl groups present on the free hydroxy groups of the polyester to form urethane linkages.

Alternatively, the blocked polyisocyanate may be a cross-linking effective amount of an adduct of the 1,3-diazetidine-2,4-dione dimer of isophorone diisocyanate and a diol having the structure

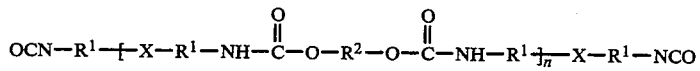

wherein $R^1$ is a divalent 1-methylene-1,3,3-trimethyl-5-cyclohexyl radical, i.e., a radical having the structure

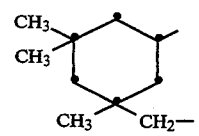

$R^2$ is a divalent aliphatic, cycloaliphatic, araliphatic or aromatic residue of a diol; and X is a 1,3-diazetidine-2,4-dionediyl radical, i.e., a radical having the structure

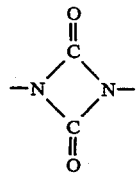

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, incorporated herein by reference, by reacting the diazetidine dimer of isophorone diisocyanate, preferably free of isocyanurate trimers of isophorone diisocyanate, with diols in a ratio of reactants which gives as isocyanto:hydroxyl ratio of about 1:0.5 to 1:0.9, preferably 1:0.6 to 1:0.8. The adduct preferably has a molecular weight of 1450 to 2800 and a melting point of about 85 to 120° C. The preferred diol reactant is 1,4-butanediol. Such an adduct is commercially available under the name Hüls BF1540.

The amount of the blocked polyisocyanate cross-linking compound present in the compositions of this invention can be varied depending on several factors such as those mentioned hereinabove relative to the amount of component (A) which is utilized. Typically, the amount of cross-linking compound which will effectively cross-link the polymers to produce coatings having a good combination of properties is in the range of about 5 to 30 weight percent, preferably 15 to 25 weight percent, based on the total weight of components (A) and (B).

The powder coating compositions of this invention may be prepared from the compositions described herein by dry-mixing and then melt-blending component (A) and the cross-linking compound, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a ZSK Twin Screw extruder at 90° to 130° C., granulated and finally ground. The melt blending should be carried out at a temperature sufficiently low to prevent the unblocking of the polyisocyanate cross-linking compound and thus avoiding premature cross-linking.

Typical of the additives which may be present in the powder coating compositions include benzoin, flow aids or flow control agents which aid the formation of a smooth, glossy surface, stabilizers, pigments and dyes.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., MODAFLOW from Monsanto Company and ACRONAL from BASF. Other flow control agents which may be used include Modarez MFP available from SYNTHRON, EX 486 available from Troy Chemical, BYK 360P available from BYK Mallinkrodt and PERENOL F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 40 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistance materials such as glass, ceramic and various metal materials. The compositions are especially useful for producing coatings on articles constructed of metals and metal alloys, particularly steel articles. It is also possible to coat many thermoplastic and thermosetting resin compositions with the compositions of the present invention.

Further examples of formulation methods, additives, and methods of powder coating application may be found in User's Guide to Powder Coating, 2nd Ed., Emery Miller, editor, Society of Manufacturing Engineers, Dearborn, (1987).

The compositions and coatings of this invention are further illustrated by the following examples. All inherent viscosities are determined at 25° C. in a (60/40 by weight) mixture of phenol/tetrachloroethane at a concentration of 0.5 g/100 ml. Acid and hydroxyl numbers are determined by titration and are reported herein as mg of KOH consumed for each gram of polymer. The glass transition temperatures (Tg) are determined by differential scanning calorimetry (DSC) on the second heating cycle at a scanning rate of 20° per minute after the sample has been heated to melt and quenched to below the grass transition temperature of the polymer.

The molecular weights were determined by gel-permeation chromotography (GPC) on a Perkin-Elmer instrument with tetrahydrofuran as a mobile phase and solvent. Values are reported in polystyrene equivalents.

The 60 degree gloss is measured using a gloss meter (Gardner Laboratory, Inc., Model GC-9095) according to ASTM D-523.

The pencil hardness of a coating is that of the hardest pencil that will not cut into the coating according to ASTM 3363-74 (reapproved 1980). The results are expressed according to the following scale: (softest) 6B, 5B, 4B, 3B, 2B, B, HB, F, H, 2H, 3H, 4H, 5H, 6H (hardest).

Impact strength was determined by using a Gardner Laboratory, Inc. Impact Tester. A weight is dropped within a slide tube from a specified height to hit a punch having a ⅝ inch diameter hemispherical nose which is driven into the front (coated face) or back of the panel. The highest impact which does not crack the coating is recorded in inch-pounds.

Caking stability was determined by filling two-thirds of a 4 ounce wide mouth glass bottle with the powder sample. The lid is placed on the bottle and the closed container is placed into a constant temperature oven at 40 C. The powder sample is removed after 72 hours and allowed to cool to room temperature. The bottle is then gently rotated and the free flowing nature of the powder is noted. The caking stability is rated good if the powder flows freely or poor if the powder flows with difficulty.

As an alternative method for measuring caking stability, the following procedure was used: Caking stability was determined by weighing 60 grams of powder into a 4 ounce wide mouth bottle and placing a lid upon the bottle. The bottle is then placed in a constant temperature oven at 40° C. for 72 hours. To evaluate physical stability, the powder sample is then removed from the oven and allowed to stand for 1 hour at room temperature. The lid is removed from the bottle and a long blade razor knife used to cut three parallel lines in the powder followed by two additional cuts perpendicular to the original three cuts. Each cut should cut completely to the bottom of the jar to yield 12 blocks of powder. The blocks are then poured onto a tared 80 mesh screen and the screen is shaken for 1 minute. The caking stability is calculated by dividing the weight of the powder that passed through the screen by the weight of the original sample times 100. This test is referred to below as the "EVTECH Method".

Experimental Section

EXAMPLE 1

A 2000mL, 3-necked, round bottom flask equipped with a stirrer, a short distillation column, and an inlet for nitrogen, was charged with isophthalic acid (424.5 g, 2,561 Mol), terephthalic acid (106.5 g, 0.6411 Mol), tris(hydroxyethylene)isocyanurate (1084.5 g, 4.147 Mol), and 1.5 g of butylstannoic acid. The flask was loaded with the glycol and heated to 150° C. over 45 minutes. The acid monomers and catalyst were added and the reaction was heated to 210° C. over 30 minutes. The reaction was then maintained, under nitrogen, at 210° C. for 6 hours with stirring to produce a low melt viscosity polymer. The polymer had an inherent viscosity of 0.14 dL/g, a hydroxyl number of 228, an acid number of 11, a Tg by DSC of 82° C., and a number average molecular weight of 4200.

EXAMPLE 2

A powder coating composition was prepared from the following materials:

| | |
|---|---|
| 618.0 g | RUCOTE 107, a polyester based primarily on terephthalic acid and 2,2-dimethyl-1,3-propanediol; |
| 109.0 g | Polyester of Example 1; |
| 272.0 g | HULS 1530 crosslinker; |
| 5.0 g | benzoin |
| 10.0 g | MODAFLOW III flow aid; and |
| 500.0 g | TiO$_2$, R960 (DuPont) |

The above material was melt-blended in a ZSK-30 twin screw extruder at 110° C., ground in a Bantam mill to which a stream of liquid nitrogen was fed, and classified through a 170 mesh screen on a KEK centrifugal sifter. The finely-divided powder coating composition thus obtained had an average particle size of about 50 microns.

This powder coating composition was applied electrostatically to one side of 3 inch by 9 inch panels as described above. The coating was cured (i.e., cross-linked) by heating the coated panel at 177° C. in an oven for 20 minutes. The coating on the panel had a 60 degree gloss value of 94, pencil hardness of 4H, a Gardner Impact of 160 inch-pounds, and good caking stability. The EVTECH Method test result indicated a caking stability of 99%.

Comparative Example 1

A powder coating composition was prepared from the following materials:

| | |
|---|---|
| 608.0 g | RUCOTE 107 polymer, a polyester based primarily on terephthalic acid and 2,2-dimethyl-1,3-propanediol with a hydroxyl number of about 48; |
| 107.0 g | RUCOTE 107, a polyester based primarily on isophthalic acid and trimethylol propane with a hydroxyl number of about 270; |
| 285.0 g | HULS 1530 cross-linker |
| 5.0 g | benzoin |
| 10.0 g | MODAFLOW III flow aid; and |
| 500.0 g | TiO$_2$, R960 (DuPont). |

Using the procedure of Example 2, these panels were coated with this composition and the coatings were cured and evaluated. The coatings had a 60 degree gloss of 94, a pencil hardness of 4H, a Gardner Impact of 160 inch-pounds, and poor caking stability. The EVTECH Method test result was 80%.

We claim:
1. A powder coating composition in the form of an intimate blend, in a finely divided form, comprising
   A. a blend of resins comprising
      1. about 10 to 40 percent by weight of a polyester resin having a glass temperature of at least 55° C., a hydroxyl number of about 190 to 320, and an inherent viscosity of about 0.1 to 0.5 dL/g determined at 25° C. in a (60/40 by weight) mixture of phenol/tetra-chloroethane at a concentration of 0.5 g/100 ml; said polyester comprised of
         a. diacid residues comprised of at least 50 mole percent of isophthalic acid residues; and b. diol residues comprised of from about 50 to 100 mole percent of residues of tris(hydroxyethyl)isocyanurate; and 2. about 60 to 90 percent by weight of a polyester resin comprised of at least 70 mole percent of residues of terephthalic acid and 2,2-dimethyl-1,3-propanediol and having a Tg of 55° to 85° C., a hydroxyl number of 30 to 80, and an inherent viscosity of about 0.1 to 0.3 dL/g; and B. a cross-linking effective amount of a blocked polyisocyanate.

2. The powder coating composition of claim 1, wherein the component (1) resin has a hydroxyl number of about 200 to 300.

3. The powder coating composition of claim 1, wherein the blocked polyisocyanate is selected from the group consisting of isophorone diisocyanate blocked with ε-caprolactam, toluene 2,4-diisocyanate blocked with ε-caprolactam, and phenol-blocked hexamethylene diisocyanate.

4. The powder coating composition of claim 1, further comprising a pigment.

5. A powder coating composition in the form of an intimate blend, in a finely divided form, comprising
A. a blend of resins comprising
   1. about 10 to 40 percent by weight of a polyester resin having a glass temperature of at least 55° C., a hydroxyl number of about 190 to 320, and an inherent viscosity of about 0.1 to 0.5 dL/g determined at 25° C. in a (60/40 by weight) mixture of phenol/tetra-chloroethane at a concentration of 0.5 g/100 ml; said polyester comprised of
      a. diacid residues comprised of at least 75 mole percent of isophthalic acid residues; and
      b. diol residues comprised of from about 75 to 100 mole percent of residues of tris(hydroxyethyl)isocyanurate; and
   2. about 60 to 90 percent by weight of a polyester resin comprised of at least 70 mole percent of residues of terephthalic acid and 2,2-dimethyl-1,3-propanediol and having a Tg of 55° to 85° C., a hydroxyl number of 30 to 80, and an inherent viscosity of about 0.1 to 0.3 dL/g; and
B. a cross-linking effective amount of a blocked polyisocyanate.

6. The powder coating composition of claim 5, wherein the component (1) resin has a hydroxyl number of about 200 to 300.

7. The powder coating composition of claim 5, wherein the blocked polyisocyanate is selected from the group consisting of isophorone diisocyanate blocked with ε-caprolactam, toluene 2,4-diisocyanate blocked with ε-caprolactam, and phenol-blocked hexamethylene diisocyanate.

8. The powder coating composition of claim 5, further comprising a pigment.

9. A powder coating composition in the form of an intimate blend, in a finely divided form, comprising
A. a blend of resins comprising
   1. about 15 to 25 percent by weight of a polyester resin having a glass temperature of at least 55° C., a hydroxyl number of about 190 to 320, and an inherent viscosity of about 0.1 to 0.5 dL/g determined at 25° C. in a (60/40 by weight) mixture of phenol/tetra-chloroethane at a concentration of 0.5 g/100 ml; said polyester comprised of
      a. diacid residues comprised of at least 90 mole percent of isophthalic acid residues; and
      b. diol residues comprised of from about 80 to 100 mole percent of residues of tris(hydroxyethyl)isocyanurate; and
   2. about 75 to 85 percent by weight of a polyester resin comprised of at least 70 mole percent of residues of terephthalic acid and 2,2-dimethyl-1,3-propanediol and having a Tg of 55° to 85° C., a hydroxyl number of 30 to 80, and an inherent viscosity of about 0.1 to 0.3 dL/g; and
B. a cross-linking effective amount of a blocked polyisocyanate.

10. The powder coating composition of claim 9, wherein the component (1) resin has a hydroxyl number of about 200 to 300.

11. The powder coating composition of claim 9, wherein the blocked polyisocyanate is selected from the group consisting of isophorone diisocyanate blocked with ε-caprolactam, toluene 2,4-diisocyanate blocked with ε-caprolactam, and phenol-blocked hexamethylene diisocyanate.

12. The powder coating composition of claim 9, further comprising a pigment.

13. A shaped or formed article coated with the cured composition of claim 1.

14. A shaped or formed article coated with the cured composition of claim 5.

15. A shaped or formed article coated with the cured composition of claim 9.

* * * * *